US012392452B2

(12) United States Patent
Son et al.

(10) Patent No.: US 12,392,452 B2
(45) Date of Patent: Aug. 19, 2025

(54) LNG STORAGE TANK AND SHIP HAVING THEREOF

(71) Applicant: POSCO, Pohang-si (KR)

(72) Inventors: Sang-Hun Son, Gangnam-gu (KR); Myung-Hyun Noh, Incheon (KR); Eung-Soo Kim, Incheon (KR)

(73) Assignee: POSCO, Pohang-si (KR)

( * ) Notice: Subject to any disclaimer, the term of this patent is extended or adjusted under 35 U.S.C. 154(b) by 595 days.

(21) Appl. No.: 17/786,284

(22) PCT Filed: Dec. 4, 2020

(86) PCT No.: PCT/KR2020/017657
§ 371 (c)(1),
(2) Date: Jun. 16, 2022

(87) PCT Pub. No.: WO2021/125646
PCT Pub. Date: Jun. 24, 2021

(65) Prior Publication Data

US 2023/0027991 A1 Jan. 26, 2023

(30) Foreign Application Priority Data

Dec. 18, 2019 (KR) ........................ 10-2019-0169979

(51) Int. Cl.
*F17C 7/00* (2006.01)
*B63B 25/16* (2006.01)
(Continued)

(52) U.S. Cl.
CPC ................ *F17C 7/00* (2013.01); *B63B 25/16* (2013.01); *B63H 21/38* (2013.01); *F17C 9/00* (2013.01);
(Continued)

(58) Field of Classification Search
CPC ...... F17C 7/00; F17C 9/00; F17C 9/04; B63B 25/00; B63B 25/16; B63H 21/00; B63H 21/38
(Continued)

(56) References Cited

U.S. PATENT DOCUMENTS 6,234,197 B1 5/2001 McKiernan et al.
7,584,623 B2 * 9/2009 Spittael ..................... F17C 7/02 440/88 F
2018/0127064 A1 5/2018 Werner

FOREIGN PATENT DOCUMENTS

CN 1511099 A 7/2004
CN 103347778 A 10/2013
(Continued)

OTHER PUBLICATIONS

Office Action issued Feb. 26, 2024 for Chinese Patent Application No. 202080087343.X (See English Translation).
(Continued)

*Primary Examiner* — Lars A Olson
(74) *Attorney, Agent, or Firm* — MORGAN, LEWIS & BOCKIUS LLP

(57) ABSTRACT

A liquefied gas storage tank according to an embodiment of the present invention may comprise: a tank unit in which liquefied gas is stored; an inner box unit disposed inside the tank unit and installed at the bottom portion of the tank unit; and a pump unit that has an inlet pipe part formed to pass through a lower wall portion of the inner box unit and communicate with the inside of the inner box unit, and suctions the liquefied gas stored in the tank unit through the inlet pipe part, thereby supplying the liquefied gas to the outside.

13 Claims, 6 Drawing Sheets

(51) Int. Cl.
*B63H 21/38* (2006.01)
*F17C 9/00* (2006.01)
*B63B 25/08* (2006.01)

(52) U.S. Cl.
CPC ....... *B63B 25/08* (2013.01); *F17C 2205/0352* (2013.01); *F17C 2223/0161* (2013.01); *F17C 2227/0135* (2013.01); *F17C 2265/066* (2013.01); *F17C 2270/0105* (2013.01)

(58) Field of Classification Search
USPC ......................................................... 440/88 F
See application file for complete search history.

(56) References Cited

FOREIGN PATENT DOCUMENTS

| | | | |
|---|---|---|---|
| CN | 103518094 | A | 1/2014 |
| CN | 104094041 | A | 10/2014 |
| CN | 105042328 | A | 11/2015 |
| CN | 108068993 | A | 5/2018 |
| DE | 9313562 | U1 | 11/1993 |
| EP | 0715703 | B1 | 9/2000 |
| EP | 1383676 | B1 | 1/2006 |
| EP | 2813746 | A1 | 12/2014 |
| EP | 2705295 | B1 | 1/2016 |
| JP | 2008-150975 | A | 7/2008 |
| JP | 2019-044733 | A | 3/2019 |
| KR | 20-1996-0023295 | U | 7/1996 |
| KR | 20-1999-0031466 | U | 7/1999 |
| KR | 10-0650606 | B1 | 11/2006 |
| KR | 10-0852539 | B1 | 8/2008 |
| KR | 10-2010-0133051 | A | 12/2010 |
| KR | 10-2011-0126575 | A | 11/2011 |
| KR | 10-2011-0129558 | A | 12/2011 |
| KR | 10-2014-0091891 | A | 7/2014 |
| WO | 2012/107993 | A1 | 8/2012 |

OTHER PUBLICATIONS

International Search Report dated Mar. 5, 2021 issued in International Patent Application No. PCT/KR2020/017657 (with English translation).
Extended European Search Report dated Jan. 5, 2023 issued in European Patent Application No. 20901956.1.
Decision to Grant dated Apr. 29, 2025, issued in corresponding Chinese Patent Application No. 202080087343.X with an English translation.

* cited by examiner

【FIG. 1】
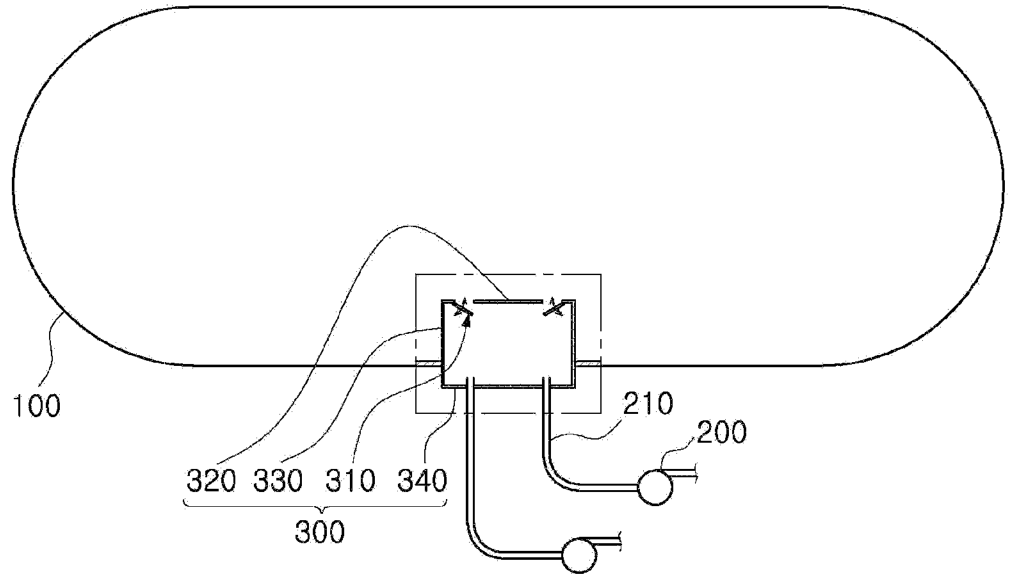
【FIG. 2】
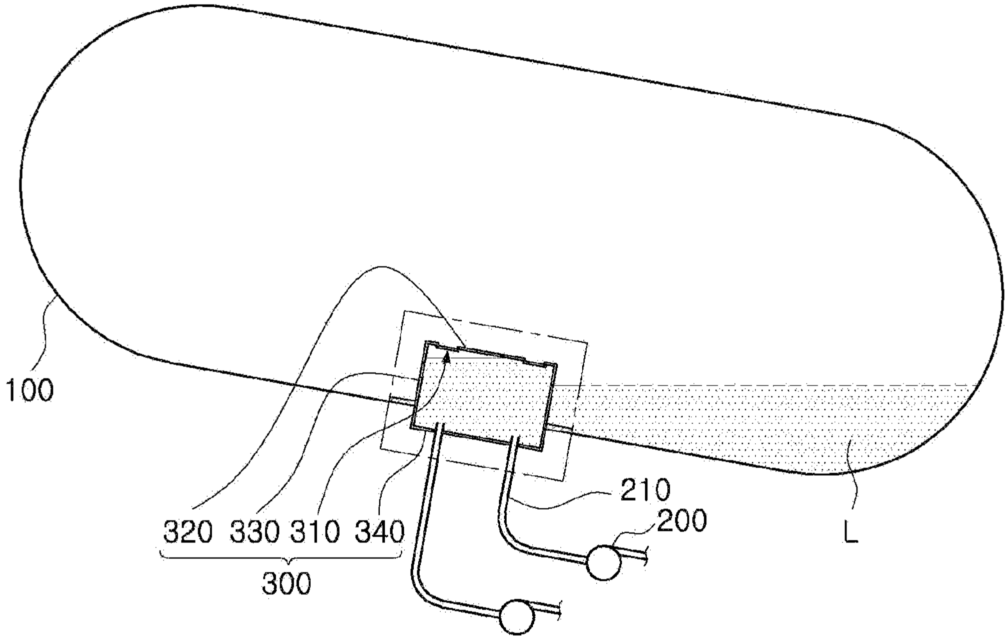

【FIG. 3】
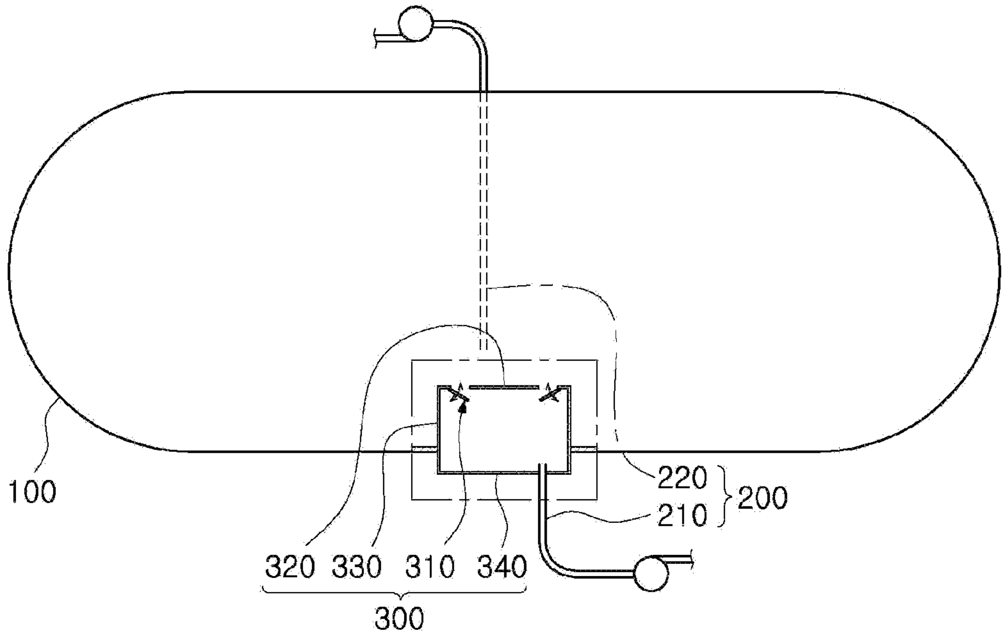
【FIG. 4】
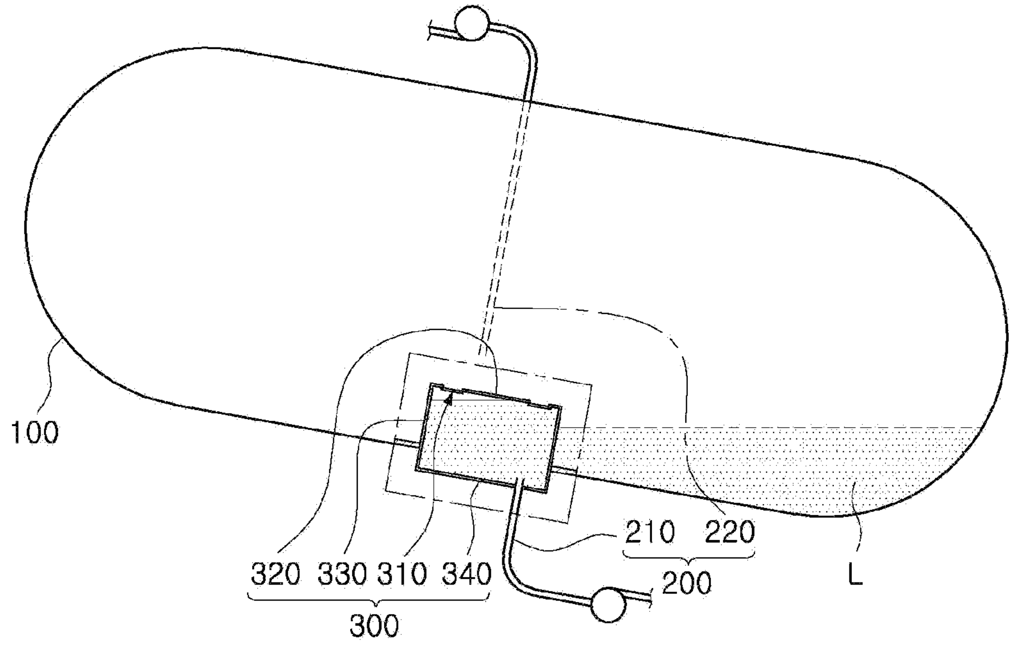

【FIG. 5】
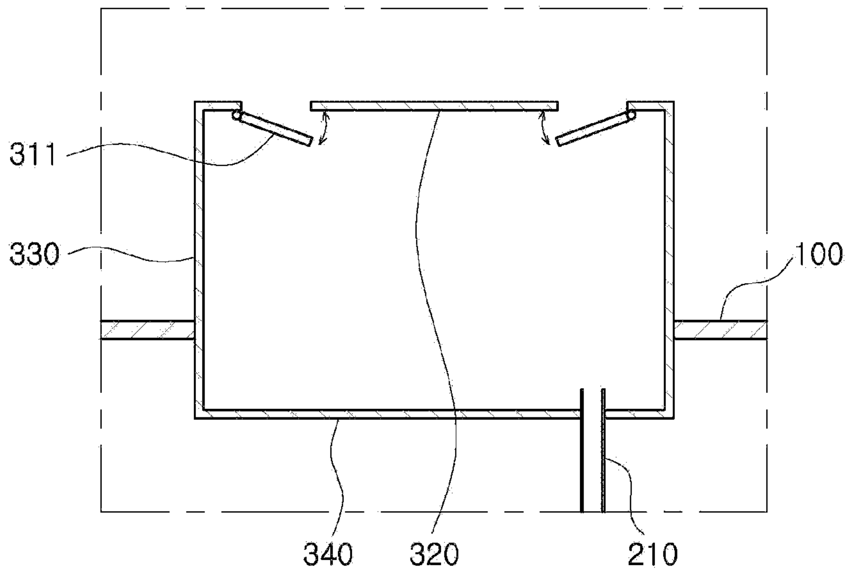
【FIG. 6】
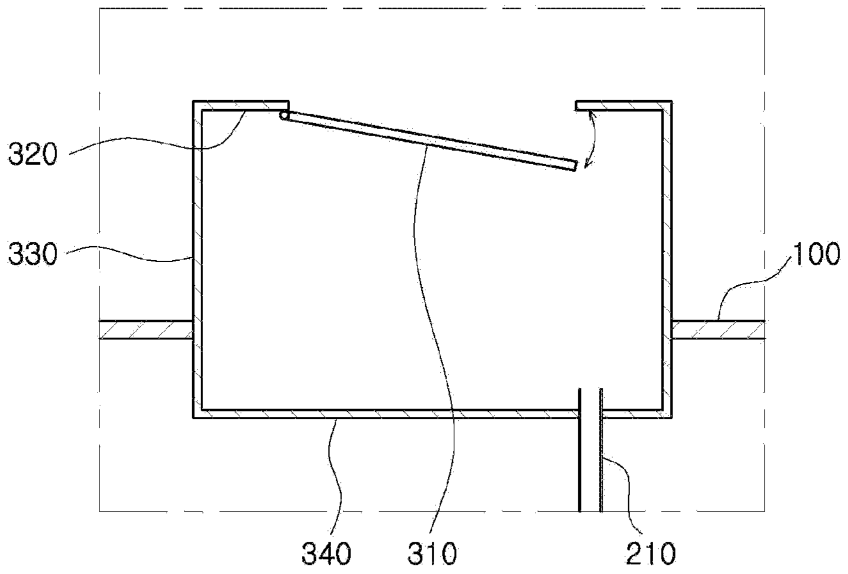

【FIG. 7】
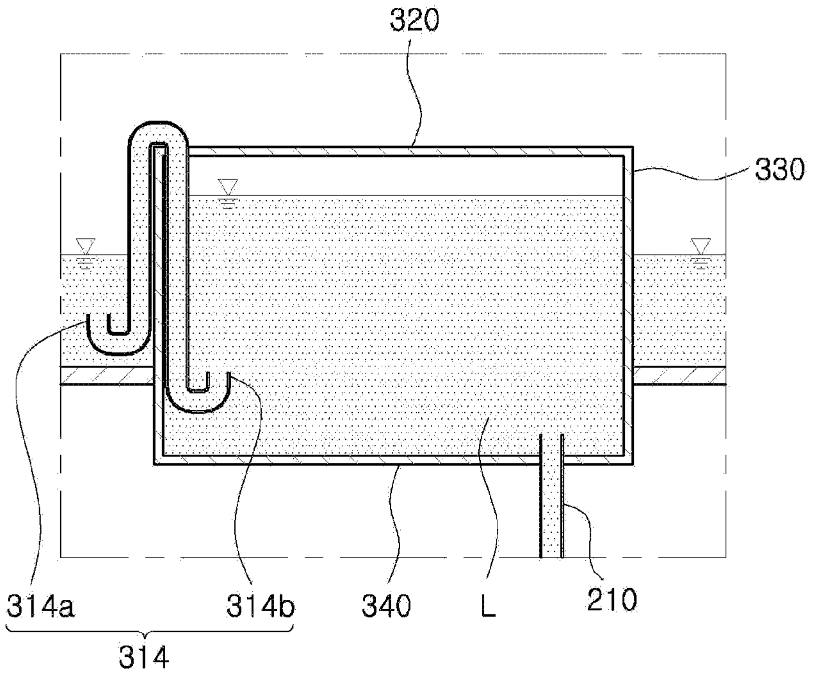
【FIG. 8】
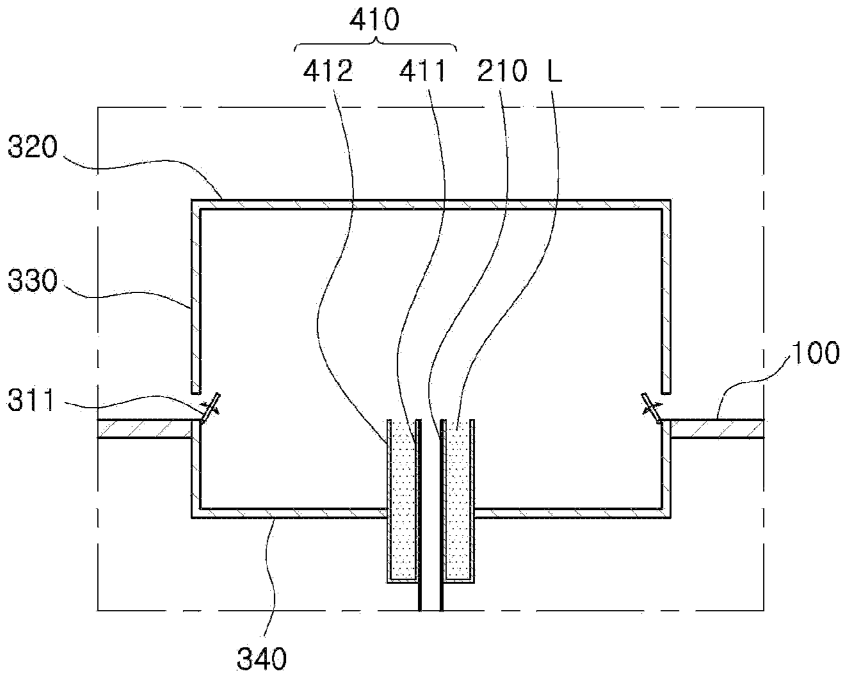

【FIG. 9】
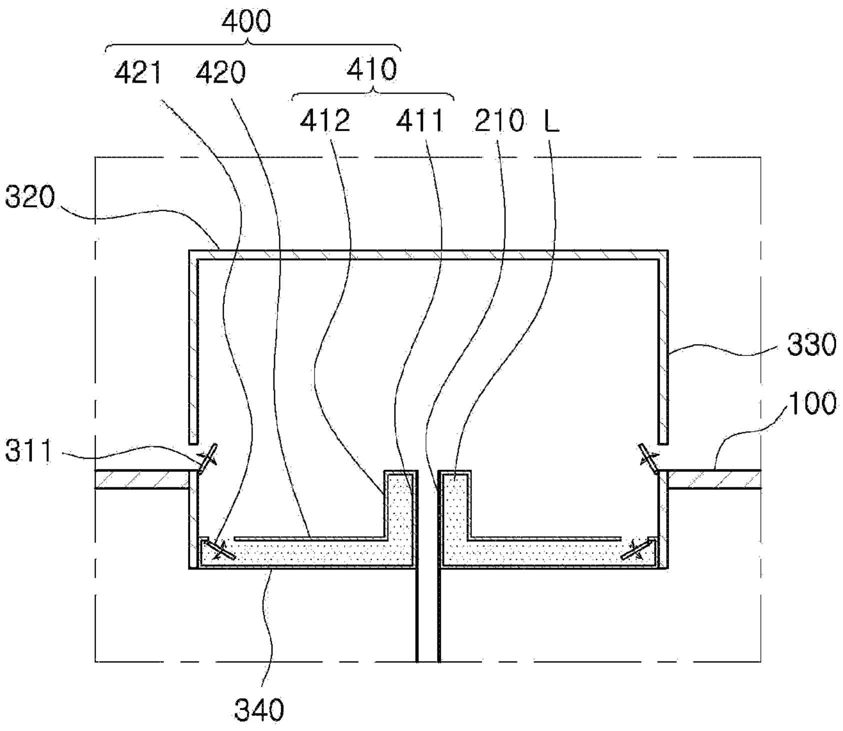

【FIG. 10】
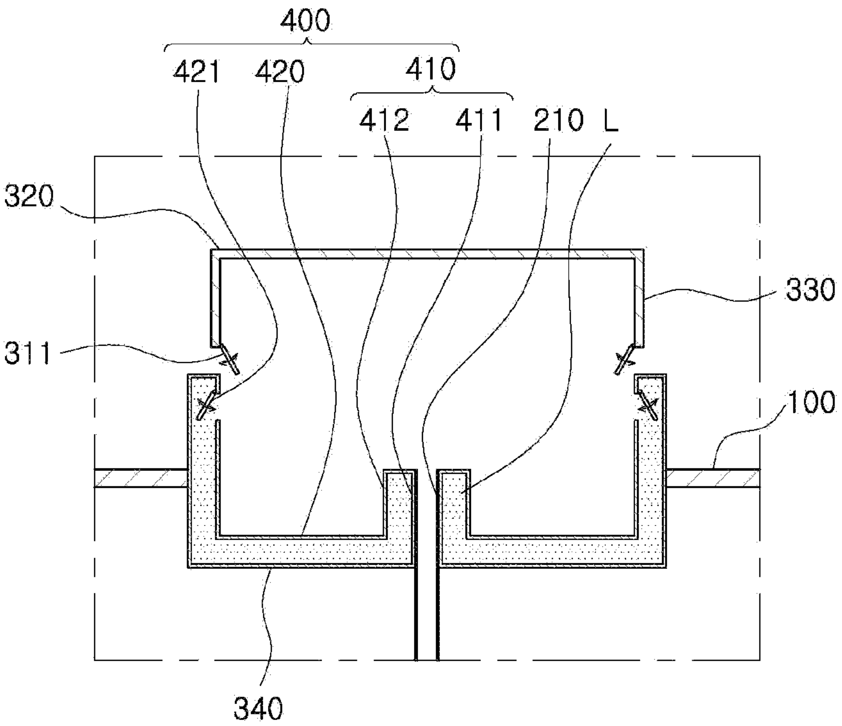
【FIG. 11】
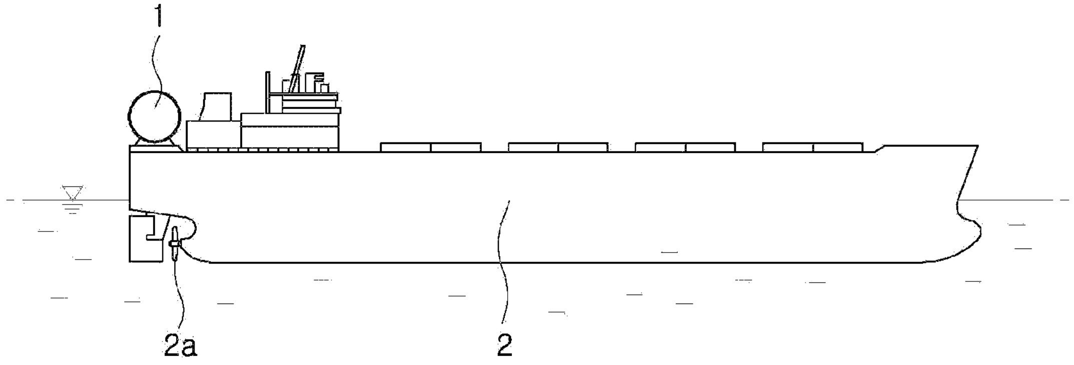

LNG STORAGE TANK AND SHIP HAVING THEREOF

CROSS-REFERENCE OF RELATED APPLICATIONS

This application is the U.S. National Phase under 35 U.S.C. § 371 of International Patent Application No. PCT/KR2020/017657, filed on Dec. 4, 2020, which in turn claims the benefit of Korean Application No. 10-2019-0169979, filed on Dec. 18, 2019, the entire disclosures of which applications are incorporated by reference herein.

TECHNICAL FIELD

The present invention relates to a liquefied gas storage tank and a ship having the same.

BACKGROUND ART

In general, petroleum resources used as transportation fuels for automobiles and ships and as various fuels used domestically and abroad are gradually being depleted, and the amount of liquefied gas used as alternative energy is increasing due to the rise in oil prices, increasingly stringent environmental regulations, and the like.

For example, liquefied gas includes liquefied natural gas (LNG), liquefied petroleum gas (LPG), or the like. Since a volume of liquefied gas is greatly reduced as compared to a gaseous state (for example, a volume of LNG may be reduced to 1/600 when the LNG is liquefied, and LPG may be greatly reduced to 1/250 when the LPG is liquefied), the liquefied gas is convenient for storage and transportation in a liquefied state, but has a difficulty in maintaining temperature below a boiling point (about −162° C. for LNG, and about −50° C. for LPG).

In order to store this liquefied gas, a cryogenic liquefied gas storage tank that maintains the liquefied gas below the boiling point is required.

However, the liquefied gas storage tank is a structure for storing liquefied fuel for a transport vehicle such as a ship, and since the liquefied gas storage tank has liquid stored therein, the liquefied gas storage tank may not always be level with a water surface or the ground due to the movement of a floating structure such as a ship or a land transport vehicle, resulting in a flow of liquid fuel occurring.

In addition, as the liquid fuel is consumed, when the level of the liquefied gas fuel inside the liquefied gas storage tank is lowered, and the inclination of the above-described liquefied gas storage tank occurs, there is a problem in which an inlet pipe of the pump unit for supplying the liquefied gas fuel inside the liquefied gas storage tank to the outside is not immersed in the liquefied gas fuel, but is exposed to the space of the liquefied gas storage tank.

Accordingly, gas such as vaporized fuel gas is introduced through the inlet pipe, and accordingly, gas is introduced into components of an engine to which the liquefied gas fuel is to be supplied, which causes a failure, and there is a problem in which the engine system of the transport vehicle needs to be stopped in order to prevent this situation.

As a result, the capacity of the liquefied gas storage tank may not be utilized to the maximum, and there are limitations in that a loss of a travel distance and a time loss due to frequent refueling are caused, and fuel consumption efficiency is reduced due to an increased weight of a transport vehicle such as a ship as liquefied gas fuel in the liquefied gas storage tank needs to always be filled to a certain depth or more.

In addition, when a part of the inlet pipe is not immersed in the liquefied gas fuel, and thus, is exposed to the space of the liquefied gas storage tank, since the part of the inlet pipe is exposed to a relatively high temperature area, even if the liquefied gas fuel is introduced into the inlet pipe, there is a problem in which the liquefied gas may be vaporized during transport and transmitted to the outside of the engine, etc.

Therefore, in order to solve or improve the above-described problems, there is a need to study a liquefied gas storage tank and a ship having the same.

DISCLOSURE

Technical Problem

The present invention provides a liquefied gas storage tank capable of preventing a problem in which an inlet pipe of a pump unit is not immersed in liquefied gas fuel, and thus, is exposed to a space of the liquefied gas storage tank, and a ship having the same.

The present invention provides a liquefied gas storage tank capable of preventing a problem in which an inlet pipe of a pump unit is exposed to a relatively high-temperature space filled with gas in the liquefied gas storage tank, and a ship including the same.

Technical Solution

In an aspect of the present invention, a liquefied gas storage tank may include: a tank unit in which liquefied gas is stored; an inner box unit that is disposed inside the tank unit and installed in a bottom portion of the tank unit; and a pump unit that has an inlet pipe part formed to pass through a lower wall portion of the inner box unit and communicate with the inside of the inner box unit, and suctions the liquefied gas stored in the tank unit through the inlet pipe part and supplies the liquefied gas to the outside.

The inner box unit may be formed to be depressed downwardly from the bottom portion of the tank unit.

The inner box unit may be provided to surround the inlet pipe.

The inner box unit may include a backflow prevention unit provided so that the liquefied gas is introduced but not discharged.

The backflow prevention unit may include a first flip door provided in the inner box unit opened and closed only in one direction.

At least one first flip door may be provided on an upper wall portion or a side wall portion of the inner box unit.

One end portion of the first flip door may be hinged to one side of an opening of the inner box unit, and the other end portion thereof may be provided to extend so as to be caught on an inner surface of the inner box unit, and the first flip door may move in close contact with the inner box unit by elasticity.

The backflow prevention unit may include a difference pressure pipe having a differential pressure inlet end portion that extends outwardly of the inner box unit and a differential pressure outlet end portion that extends into the inner box unit and is disposed at a height lower than the differential pressure inlet end portion.

The liquefied gas storage tank may further include: a cryogenic unit that is provided to be in contact with at least the inlet pipe, and has the liquefied gas contained therein.

The cryogenic unit may include an insertion cylinder part that is provided to pass through the inlet pipe so that the inside of the inner box unit communicates with the inlet pipe and formed in a cylindrical shape in contact with the inlet pipe.

The insertion cylinder part may include: an inner pipe part that is in contact with the inlet pipe; and an exterior part that is spaced apart from the inner pipe part at a predetermined interval to accommodate the liquefied gas and has a lower end portion coupled to the inner pipe part.

The insertion cylinder part may have an opened upper end portion.

The cryogenic unit may include a double wall portion provided with a second flip door that communicates with a lower end portion of the insertion cylinder, extend to a lower wall portion of the inner box unit or the lower wall portion and a side wall portion of the inner box unit, and may be opened and closed only in one direction so that the liquefied gas is introduced into the second flip door.

In another aspect of the present invention, a ship may include: the liquefied gas storage tank; and a hull that is provided with a liquefied gas storage tank, and includes an engine unit providing driving force.

Advantageous Effects

According to a liquefied gas storage tank and a ship having the same of the present invention, it is possible to prevent a problem in which an inlet pipe of a pump unit is not immersed in liquefied gas fuel, and thus, is exposed to a space of the liquefied gas storage tank.

In another aspect, according to a liquefied gas storage tank and a ship having the same of the present invention, it is possible to prevent a problem in which an inlet pipe of a pump unit is exposed to a relatively high-temperature space filled with gas in the liquefied gas storage tank.

As a result, it is possible to prevent a problem in which gas is introduced into a configuration of an engine or the like to which liquefied gas fuel is to be supplied and thus a failure is caused, and an engine unit is stopped while the ship is moving.

In addition, it is possible to utilize the capacity of the liquefied gas storage tank to the maximum to increase a travel distance, prevent a time loss due to frequent refueling, and improve a problem in which fuel consumption efficiency is reduced due to an increased weight of a ship as liquefied gas fuel in the liquefied gas storage tank needs to always be filled to a certain depth or more.

However, various and beneficial advantages and effects of the present invention are not limited to the contents described above, and may be more easily understood in a process of describing exemplary embodiments of the present invention.

BRIEF DESCRIPTION OF THE DRAWINGS

FIG. 1 is a front view illustrating a liquefied gas storage tank of the present invention.

FIG. 2 is a front view illustrating a state in which the liquefied gas storage tank of the present invention is inclined.

FIG. 3 is a front view illustrating an embodiment in which a supply pipe part is connected to an upper side of a tank unit in the liquefied gas storage tank of the present invention.

FIG. 4 is a front view illustrating a state in which the liquefied gas storage tank is inclined in the embodiment in which the supply pipe part of the liquefied gas storage tank of the present invention is connected to the upper side of the tank unit.

FIG. 5 is a front view illustrating a part of an inner box unit in the liquefied gas storage tank of the present invention.

FIG. 6 is a front view illustrating an embodiment in which one first flip door is provided on an upper wall portion of the inner box unit in the liquefied gas storage tank of the present invention.

FIG. 7 is a front view illustrating an embodiment in which a differential pressure pipe is provided in the inner box unit in the liquefied gas storage tank of the present invention.

FIG. 8 is a front view illustrating an embodiment in which a cryogenic unit is provided in the liquefied gas storage tank of the present invention.

FIG. 9 is a front view illustrating an embodiment in which the cryostat unit extends to a lower wall portion in the liquefied gas storage tank of the present invention.

FIG. 10 is a front view illustrating an embodiment in which the cryostat unit extends to the lower wall portion and a side wall portion in the liquefied gas storage tank of the present invention.

FIG. 11 is a side view illustrating the liquefied gas storage tank of the present invention and a ship having the same.

BEST MODE

Hereinafter, exemplary embodiments in the present invention will be described with reference to the accompanying drawings. However, exemplary embodiments in the present invention may be modified in several other forms, and the scope of the present invention is not limited to exemplary embodiments to be described below. Rather, these exemplary embodiments are provided so that the present invention will completely describe the present invention to those skilled in the art. In the drawings, shapes, sizes, and the like, of components may be exaggerated for clarity.

In addition, in the present specification, a singular expression includes a plural expression unless the context clearly dictates otherwise, and the same or similar reference numerals refer to the same or corresponding components throughout the specification.

The present invention relates to a liquefied gas storage tank 1 and a ship having the same, in which an inlet pipe 210 of a pump unit 200 is formed to pass through a lower wall portion 340 of an inner box unit 300 and extend to an inside of the inner box unit 300, and thus, may be configured to be immersed in liquefied gas L fuel positioned in the lower wall portion 340 by gravity.

In addition, the inner box unit 300 includes a backflow prevention unit 310 that surrounds the inlet pipe 210 of the pump unit 200 and is provided so that the liquefied gas L is introduced but not discharged, so it is possible to prevent a problem in which the inlet pipe 210 is not immersed in the liquefied gas L fuel, and thus, is exposed to a space of the liquefied gas storage tank 1.

In another aspect, a liquefied gas storage tank and a ship having the same of the present invention include a cryogenic unit 400, so it is possible to prevent a problem in which the inlet pipe 210 is exposed to a relatively high-temperature space filled with the gas of the liquefied gas storage tank 1.

As a result, it is possible to prevent a problem in which a failure is caused due to the introduction of gas into the configuration of the engine or the like to which the liquefied gas L fuel is to be supplied, thereby preventing a problem in which an engine unit 2*a* is stopped during the movement of the ship, and it is possible to utilize the capacity of the liquefied gas storage tank 1 to the maximum, thereby increasing a travel distance, preventing a time loss due to frequent refueling, and improving a reduction in fuel consumption efficiency due to an increased weight of the ship.

Describing in detail with reference to the drawings, FIG. 1 is a front view illustrating the liquefied gas storage tank 1 of the present invention, and FIG. 2 is a front view illustrating a state in which the liquefied gas storage tank 1 of the present invention is inclined.

That is, as illustrated in FIGS. 1 and 2, the plurality of inlet pipes 210 may be provided, and may be formed to pass through the lower wall portion 340 of the inner box unit 300.

FIG. 3 is a front view illustrating an embodiment in which the supply pipe part 220 is connected to an upper side of the tank unit 100 in the liquefied gas storage tank 1 of the present invention, and FIG. 4 is a front view illustrating a state in which the liquefied gas storage tank 1 of the present invention is inclined in the embodiment in which the supply pipe part 220 of the liquefied gas storage tank 1 of the present invention is connected to the upper side of the tank unit 100.

That is, as illustrated in FIGS. 3 and 4, one inlet pipe 210 is provided, and is formed to pass through the lower wall portion 340 of the inner box unit 300, and the supply pipe part 220 for transmitting the liquefied gas L to the liquefied gas storage tank 1 may be formed to extend from the upper side.

In addition, FIG. 5 is a front view illustrating a portion of the inner box unit 300 in the liquefied gas storage tank 1 of the present invention, and FIG. 6 is a front view illustrating an embodiment in which one first flip door 311 is provided on the upper wall portion 320 of the inner box unit 300 in the liquefied gas storage tank 1 of the present invention.

Referring to FIG. 5, the liquefied gas storage tank 1 according to the embodiment of the present invention may include the tank unit 100 in which the liquefied gas L is stored, the inner box unit 300 that is disposed inside the tank unit 100 and installed at a bottom portion of the tank unit 100, and the pump unit 200 that has the inlet pipe 210 formed to pass through the lower wall portion 340 of the inner box unit 300 and to communicate with the inside of the inner box unit 300, and suctions the liquefied gas L stored in the tank unit through the inlet pipe 210 and supplies the liquefied gas to the outside.

In this way, in the liquefied gas storage tank 1 of the present invention, the inlet pipe 210 of the pump unit 200 is formed to pass through the lower wall portion 340 of the inner box unit 300 and communicate with the inside of the inner box unit 300, so the inlet pipe 210 may be configured to not be exposed to a high-temperature space by being out of the low-temperature liquefied gas L.

In other words, the low-temperature liquefied gas L is pooled in the lower wall portion 340 by gravity. As such, by connecting the inlet pipe 210 to the lower wall portion 340 where the low-temperature liquefied gas L is located, it is possible to prevent the inlet pipe 210 from being exposed to the high-temperature space.

To this end, the inlet pipe 210 may be coupled to the lower wall portion 340 of the inner box unit 300, and may be provided at the same height as the lower wall portion 340. Alternatively, the inlet pipe 210 may be formed to extend into the inner box unit 300 at a predetermined height.

Here, the inner box unit 300 of the liquefied gas storage tank 1 according to the embodiment of the present invention may be formed to be depressed downwardly from the bottom portion of the tank unit 100.

According to this configuration, since the lower wall portion 340 of the inner box unit 300 is formed at a lower height than the bottom portion of the tank unit 100, the liquefied gas L received in the tank unit 100 may converge to the lower wall portion 340 of the inner box unit 300 located at the lowest height.

In addition, the inner box unit 300 of the liquefied gas storage tank 1 according to the embodiment of the present invention may be provided to surround a periphery of the inlet pipe 210.

Here, the inner box unit 300 of the liquefied gas storage tank according to the embodiment of the present invention may include a backflow prevention unit 310 provided so that the liquefied gas L is introduced but not discharged.

In this way, the liquefied gas storage tank 1 of the present invention is provided to surround the periphery of the inlet pipe 210 of the pump unit 200, and has the liquefied gas L accommodated therein in one-way, so, as the liquefied gas L fuel is used inside the tank unit 100, a water level of the liquefied gas L fuel is lowered, or as the liquefied gas storage tank 1 is inclined due to sloshing of a ship or the like, the periphery of the inlet pipe 210 may be filled with the liquefied gas L fuel even if the liquefied gas L fuel is biased to one side.

As a result, it is possible to prevent a problem in which a failure is caused due to the introduction of gas into the configuration of the engine or the like to which the liquefied gas L fuel is to be supplied, thereby preventing a problem in which an engine unit 2*a* is stopped during the movement of the ship, and it is possible to utilize the capacity of the liquefied gas storage tank 1 to the maximum, thereby increasing a travel distance, preventing a time loss due to frequent refueling, and improving a reduction in fuel consumption efficiency due to an increased weight of the ship.

The tank unit 100 has a configuration that may store cryogenic liquefied gas L, such as liquefied natural gas (LNG) or liquefied petroleum gas (LPG), and may be generally provided by being coupled to a hull 2 of a ship or the like.

Here, when the liquefied gas L is stored, a heat insulating material may be coupled to an outer surface of the tank unit 100 to ensure the heat insulation of the liquefied gas L.

In addition, the tank unit 100 may include a support member 110 provided therein in order to store internal high-pressure liquefied gas L, and the support member 110 may be provided in a ring shape in the circumferential direction of the tank unit 100. For example, the support member 110 may be provided in the form of a disk having a hole in the middle.

The pump unit 200 serves to transmit the liquefied gas L fuel inside the tank unit 100 to the outside.

However, in order for the pump unit 200 to transmit the liquefied gas L fuel to the outside, the inlet pipe 210 of the pump unit 200 needs to be immersed in the liquefied gas L. Conventionally, when the sloshing phenomenon occurs, there is a problem in which the inlet pipe 210 is not immersed in the liquefied gas L fuel, and thus, is exposed to a gas space of the liquefied gas storage tank 1 according to the present invention, by providing the inner box unit 300, it is possible to improve this problem.

In addition, the liquefied gas L is located in the lower wall portion 340 by gravity, and the inlet pipe 210 may be provided on the lower wall portion 340 to be more easily immersed in the liquefied gas L.

In addition, the pump unit 200 may also include the supply pipe part 220 for supplying the liquefied gas L into the tank unit 100 from the outside. The supply pipe part 220 may be connected to an upper portion of the tank unit 100, or may be connected to a lower portion of the tank unit 100 in the same manner as the inlet pipe 210.

The inner box unit 300 serves to fill the periphery of the inlet pipe 210 with the liquefied gas L fuel. To this end, the inner box unit 300 is provided in the form of a container surrounding the periphery of the inlet pipe 210, and includes the backflow prevention unit 310 through which the liquefied gas L is introduced but not discharged.

As an example of the backflow prevention unit 310, there may be a flip-type first flip door 311 that is opened only in one-way.

That is, the backflow prevention unit 310 of the liquefied gas storage tank 1 according to the embodiment of the present invention is provided in the inner box unit 300, but may include the first flip door 311 that is provided to be opened and closed only in one direction.

In other words, the first flip door 311 closes an opened area of the inner box unit 300, but may be configured to move the liquefied gas L to be opened in an inflow direction.

Specifically, in the first flip door 311 of the liquefied gas storage tank 1 according to the embodiment of the present invention, one end portion of the first flip door 311 may be hinged to one side of an opening of the inner box unit 300 and the other end portion thereof may be provided to extend so as to be caught on an inner surface of the inner box unit 300, and the first flip door 311 may move in close contact with the inner box unit 300 due to elasticity.

That is, when the first flip door 311 is pushed in order to move the liquefied gas L from the inside of the inner box unit 300 to the outside, the first flip door 311 moves to close the opened area of the inner box unit 300, and is no longer actuated to be opened by pivoting outward, whereas, when the first flip door 311 is pushed to the inside of the inner box unit 300 in order to move the liquefied gas L from the outside of the inner box unit 300 to the inside, the first flip door 311 is actuated to be opened by pivoting.

In this case, one end portion of the first flip door 311, which is hinged to the inner box unit 300, may be provided with a spring member or the like whose elastic force is applied to the outside.

Here, at least one first flip door 311 of the liquefied gas storage tank 1 according to the embodiment of the present invention may be provided on the upper wall portion 320 or the side wall portion 330 of the inner box unit 300.

In other words, the opening through which the liquefied gas L is introduced into the inner box unit 300 may be formed not only in the upper wall portion 320 of the inner box unit 300 but also in the side wall portion 330 of the inner box unit 300, and the number of openings may be singular or plural. As described above, the first flip door 311 may be installed in the opening formed in at least one of the upper wall portion 320 and the side wall portion 330 so that the liquefied gas L is accommodated only in the inner box unit 300.

In addition, the inner box unit 300 is configured to close the periphery of the inlet pipe 210 in the state in which the first flip door 311 is closed. In this case, when the liquefied gas L inside the inner box unit 300 is vaporized due to a rise in temperature, etc., the liquefied gas is vaporized in the closed area, and thus, may not be vaporized more than a certain amount. Accordingly, it is possible to improve the vaporization problem of the liquefied gas L.

In addition, the inner box unit 300 of the liquefied gas storage tank 1 according to the embodiment of the present invention may share at least one side wall portion 330 with the support member provided in the tank unit 100.

Accordingly, it is possible to improve the problem in which the weight of the liquefied gas storage tank 1 increases as the inner box unit 300 is provided.

In addition, since the inner box unit 300 is provided integrally with the support member coupled to the tank unit 100, it is possible to further increase a coupling force of the inner box unit 300.

Here, the inner box unit 300 of the liquefied gas storage tank 1 according to the embodiment of the present invention may be provided so that the side wall portion 330 coupled between the support members extends upwardly from the upper wall portion 320.

That is, the remaining side wall portion 330 further provided in addition to the side wall portion 330 replaced with the support member may be configured to include an extension further extending upwardly from the upper wall portion 320.

As a result, even when the liquefied gas L inside the tank unit 100 flows by swinging, etc., the periphery of the inner box unit 300 serves as a breakwater member so as to not be affected by the flow of the liquefied gas L.

Accordingly, it is possible to stably introduce the liquefied gas L into the inner box unit 300.

FIG. 7 is a front view illustrating an embodiment in which a difference pressure pipe 314 is provided in the inner box unit 300 of the liquefied gas storage tank 1 of the present invention. Referring to FIG. 7, the backflow prevention unit 310 of the liquefied gas storage tank 1 according to the embodiment of the present invention may include a differential pressure inlet end portion **314*a* extending to the outside of the inner box unit 300 and the difference pressure pipe 314 that extends into the inner box unit 300 and is provided with a differential pressure outlet end portion 314*b* disposed at a lower height than the differential pressure inlet end portion 314*a***.

In this way, the backflow prevention unit 310 is provided with the difference pressure pipe 314, so the liquefied gas L may be introduced into the inner box unit 300 and is not discharged.

That is, as the inner box unit 300 is provided to surround the periphery of the inlet pipe 210 and accommodates the liquefied gas L therein in one-way, even if the liquefied gas L fuel is biased to one side due to the inclination of the tank unit 100, the periphery of the inlet pipe 210 may be filled with the liquefied gas L fuel.

The difference pressure pipe 314 may move the liquefied gas L to the inner box unit 300 by the pressure difference due to the differential pressure outlet end portion **314*b* disposed inside the inner box unit 300 being lower than the differential pressure inlet end portion 314*a* disposed outside the inner box unit 300**.

That is, a height of a central portion of the difference pressure pipe 314 is not considered and only the height of both end portions of the difference pressure pipe 314 determines the flow direction of the liquefied gas L. Since the differential pressure inlet end portion **314*a* is higher than the differential pressure outlet end portion 314*b*, the liquefied gas L flows from the differential pressure inlet end portion 314*a* to the differential pressure outlet end portion 314*b***.

In addition, the backflow prevention unit 310 of the liquefied gas storage tank 1 according to the embodiment of the present invention may include an extended inlet end portion that is disposed to face the outside of the inner box unit 300 and provided with the first flip door 311 and an extended pipe that is provided with an extension outlet end portion extending into the inner box unit 300.

That is, since the first flip door 311 is provided at the extended inlet end portion of the extended pipe, the extended pipe may be configured to make the liquefied gas L flow into the inner box unit 300, but prevent the liquefied gas L from escaping to the outside thereof.

In addition, since the extended pipe extends into the inner box unit 300, it is possible to increase the number of paths along which the liquefied gas L accommodated in the inner box unit 300 moves from the extension outlet end portion to the extended inlet end portion. Accordingly, it is possible to more effectively prevent the problem in which the liquefied gas L inside the inner box unit 300 escapes to the outside through the first flip door 311.

Here, the extended pipe of the liquefied gas storage tank 1 according to the embodiment of the present invention may be formed in the form of a curved pipe in which the extended pipe is disposed in a central portion to be lower than the extended inlet end portion, and is disposed higher than the extension outlet end portion.

That is, when the extended pipe has the form of the curved pipe instead of a straight shape, since the moving path of the liquefied gas L may further increase, it is possible to more effectively prevent the liquefied gas L from escaping.

In addition, the backflow prevention unit 310 of the liquefied gas storage tank 1 according to the embodiment of the present invention may include an inclined pipe that is disposed on the side wall portion 330 of the inner box unit 300 and provided in the form of a fallopian tube communicating with the outside and has the first flip door 311 provided at the inner end portion thereof.

That is, since the inclined pipe has the first flip door 311 provided at the extended inlet end portion thereof, the inclined pipe may be configured to make the liquefied gas L flow into the inner box unit 300, but prevent the liquefied gas L from escaping to the outside thereof.

In addition, the inclined pipe is configured to have a width increasing from the inner end portion toward the outer end portion. In this way, since the liquefied gas L accommodated in the inner box unit 300 needs to pass through a relatively narrow area when escaping to the outside, it is possible to increase the effect of preventing the liquefied gas L from escaping to the outside, and when accommodating the liquefied gas L from the outside of the inner box unit 300 to the inside of the inner box unit 300, since the liquefied gas L only needs to pass through a relatively wide area, there is an effect of accommodating the liquefied gas L more easily.

FIG. 8 is a front view illustrating an embodiment in which the cryogenic unit 400 is provided in the liquefied gas storage tank 1 of the present invention, FIG. 9 is a front view illustrating an embodiment in which the cryogenic unit 400 extends to the lower wall portion 340 in the liquefied gas storage tank 1 of the present invention, and FIG. 10 is a front view illustrating an embodiment in which the cryogenic unit 400 extends to the lower wall portion 340 and the side wall portion 330 in the liquefied gas storage tank 1 of the present invention.

Referring to the drawings, the cryogenic unit 400 may be provided to be in contact with at least the inlet pipe 210 of the liquefied gas storage tank 1 according to the embodiment of the present invention, and to have the liquefied gas L contained therein.

That is, the liquefied gas storage tank 1 of the present invention may maintain the inlet pipe 210 at a low temperature by including the cryogenic unit 400, so it is possible to prevent the problem in which the liquefied gas L moving through the inlet pipe 210 is vaporized due to the rise in temperature.

In other words, even if the periphery of the inlet pipe 210 may be filled with the liquefied gas L by the inner box unit 300, when the liquefied gas L accommodated in the inner box unit 300 is discharged to the outside through the inlet pipe 210, a relatively high-temperature gas region may also be formed around the inlet pipe 210. In this case, since there may be the problem in which the liquefied gas L moving through the inlet pipe 210 is vaporized, the cryogenic unit 400 is provided.

Specifically, the cryogenic unit 400 of the liquefied gas storage tank 1 according to the embodiment of the present invention may include an insertion cylinder part 410 that is provided with the inlet pipe 210 to pass therethrough so that the inside of the inner box unit 300 communicates with the inlet pipe 210 and is formed in a cylinder shape in contact with the inlet pipe 210.

In other words, the cryogenic unit 400 includes the insertion cylinder part 410 that is in contact with the periphery of the inlet pipe 210 but has a relatively low-temperature liquefied gas L accommodated therein.

As an example, the liquefied gas L may be liquefied natural gas (LNG), liquefied propane gas (LPG), or the like. Since, for the liquefied natural gas, a boiling point is about −162° C., and for the liquefied propane gas, a boiling point is about −50° C., the temperature of the inlet pipe 210 may be maintained at about −162° C. and about −50° C., respectively.

To this end, the insertion cylinder part 410 may include an inner pipe part 411 and an exterior part 412. The insertion cylinder part 410 of the liquefied gas storage tank 1 according to the embodiment of the present invention may include the inner pipe part 411 that is in contact with the inlet pipe 210 and the exterior part 412 that is spaced apart from the inner pipe part 411 at a predetermined interval to accommodate the liquefied gas L, and has a lower end portion coupled to the inner pipe part 411.

Here, the inlet pipe 210 may be inserted into and in contact with the inner pipe part 411, and a space may be formed between the inner pipe part 411 and the outer part 412 to accommodate the liquefied gas L.

That is, the inner pipe part 411 and the exterior part 412 have a double pipe structure, and the lower end portions thereof are coupled to each other to have a structure that may accommodate the liquefied gas L without escaping.

In addition, the insertion cylinder part 410 of the liquefied gas storage tank 1 according to the embodiment of the present invention may be the form in that the upper end portion is opened.

In the case of this embodiment, it is possible to accommodate the liquefied gas L without providing the first flip door 311 or the like in the upper end portion of the insertion cylinder part 410.

However, when the first flip door 311 for moving the liquefied gas L only in one-way is provided on the upper end portion of the insertion cylinder, the first flip door 311 may be provided.

The cryogenic unit 400 of the liquefied gas storage tank 1 according to the embodiment of the present invention may include a double wall portion 420 provided with a second flip door 421 that communicates with the lower end portion of the insertion cylinder part 410, extends to the lower wall portion 340 of the inner box unit 300 or the lower wall portion 340 and the side wall portion 330 of the inner box unit 300, and is opened and closed only in one direction so that the liquefied gas L is introduced into the second flip door 421.

In addition to forming the inlet pipe 210 in a low-temperature environment, the double wall portion 420 has an effect of forming the outer portion of the inner box unit 300 in the low-temperature environment.

As a result, it is possible to improve the problem in which the liquefied gas L accommodated in the inner box unit 300 is exposed to the high temperature environment and vaporized.

In other words, the double wall portion 420 may be provided in the lower wall portion 340 of the inner box unit 300, and may be formed in an "L" shape when viewed from a front cross-sectional view. For this, reference may be made to FIG. 9.

According to this, in addition to being able to dispose the liquefied gas L in order to maintain the inlet pipe 210 in the low-temperature environment by the insertion cylinder part 410, in order to maintain the lower wall portion 340 of the inner box unit 300 in the low-temperature environment, the liquefied gas L may be disposed.

In addition, the double wall portion 420 may be provided in the lower wall portion 340 and the side wall portion 330 of the inner box unit 300, and may be formed in a "U" shape when viewed from a front cross-sectional view. For this, reference may be made to FIG. 10.

According to this, in addition to being able to dispose the liquefied gas L in order to maintain the inlet pipe 210 in the low-temperature environment by the insertion cylinder part 410, in order to maintain the lower wall portion 340 and the side wall portion 330 of the inner box unit 300 in the low-temperature environment, the liquefied gas L may be disposed.

Here, in order to accommodate the liquefied gas L in the double wall portion 420, the double wall portion 420 may be a double plate having a space formed therein, and may communicate with the space between the exterior part 412 of the insertion cylinder part 410 and the inner pipe part 411.

In order to accommodate the liquefied gas L into the double wall portion 420, the second flip door 421 is provided on the upper surface portion, and may be configured to accommodate the liquefied gas L into the double wall portion 420, but prevent the liquefied gas L from moving to the outside.

FIG. 11 is a side view illustrating the liquefied gas storage tank 1 of the present invention and the ship having the same. Referring to FIG. 11, a ship according to another embodiment of the present invention may include a hull 2 that includes the liquefied gas storage tank 1 and an engine unit **2*a* provided with the liquefied gas storage tank 1** and providing driving force.

That is, by including the above-described liquefied gas storage tank 1 in the ship, the water level of the liquefied gas L fuel is lowered as the liquefied gas L fuel is used in the tank unit 100, or even if the liquefied gas L fuel is biased to one side due to the inclination of the liquefied gas storage tank 1 due to the sloshing of the vessel, it is possible to fill the periphery of the inlet pipe 210 with the liquefied gas L fuel.

In addition, by maintaining the periphery of the inlet pipe 210 in the low-temperature environment, it is possible to prevent the liquefied gas L moving through the inlet pipe 210 from being vaporized.

As a result, it is possible to prevent the problem in which the failure is caused due to the introduction of gas into the configuration of the engine or the like to which the liquefied gas L fuel is to be supplied, thereby preventing the problem in which the engine unit **2*a* is stopped during the movement of the ship, and it is possible to utilize the capacity of the liquefied gas storage tank 1** to the maximum, thereby increasing the travel distance, preventing the time loss due to frequent refueling, and improving the reduction in fuel consumption efficiency due to the increased weight of the ship.

While exemplary embodiments have been shown and described above, it will be apparent to those skilled in the art that modifications and variations could be made without departing from the scope of the present invention as defined by the appended claims.

The invention claimed is:

1. A liquefied gas storage tank, comprising:

a tank unit in which liquefied gas is stored;

an inner box unit that is disposed inside the tank unit and installed at a bottom portion of the tank unit; and a pump unit that has an inlet pipe formed to pass through a lower wall portion of the inner box unit and communicate with the inside of the inner box unit, and suctions the liquefied gas stored in the tank unit through the inlet pipe and supplies the liquefied gas to the outside, wherein the inner box unit is formed to be depressed downwardly from the bottom portion of the tank unit, and wherein the lower wall portion of the inner box unit is formed at a lower height than the bottom portion of the tank unit.

2. The liquefied gas storage tank of claim 1, wherein the inner box unit is provided to surround a periphery of the inlet pipe.

3. The liquefied gas storage tank of claim 2, wherein the inner box unit includes a backflow prevention unit provided so that the liquefied gas is introduced but not discharged.

4. The liquefied gas storage tank of claim 3, wherein the backflow prevention unit includes a first flip door provided in the inner box unit opened and closed only in one direction.

5. The liquefied gas storage tank of claim 4, wherein at least one first flip door is provided on an upper wall portion or a side wall portion of the inner box unit.

6. The liquefied gas storage tank of claim 4, wherein one end portion of the first flip door is hinged to one side of an opening of the inner box unit, and the other end portion thereof is provided to extend so as to be caught on an inner surface of the inner box unit, and the first flip door moves in close contact with the inner box unit by elasticity.

7. A liquefied gas storage tank, comprising:

a tank unit in which liquefied gas is stored;

an inner box unit that is disposed inside the tank unit and installed at a bottom portion of the tank unit; and a pump unit that has an inlet pipe formed to pass through a lower wall portion of the inner box unit and communicate with the inside of the inner box unit, and suctions the liquefied gas stored in the tank unit through the inlet pipe and supplies the liquefied gas to the outside, wherein the inner box unit is provided to surround a periphery of the inlet pipe, wherein the inner box unit includes a backflow prevention unit provided so that the liquefied gas is introduced but not discharged, and wherein the backflow prevention unit includes a difference pressure pipe having a differential pressure inlet end portion that extends outwardly of the inner box unit and a differential pressure outlet end portion that extends into the inner box unit and is disposed at a height lower than the differential pressure inlet end portion.

8. The liquefied gas storage tank of claim 1, further comprising:

a cryogenic unit that is provided to be in contact with at least the inlet pipe, and has the liquefied gas contained therein.

9. A liquefied gas storage tank, comprising:

a tank unit in which liquefied gas is stored;

an inner box unit that is disposed inside the tank unit and installed at a bottom portion of the tank unit;

a pump unit that has an inlet pipe formed to pass through a lower wall portion of the inner box unit and communicate with the inside of the inner box unit, and suctions the liquefied gas stored in the tank unit through the inlet pipe and supplies the liquefied gas to the outside; and a cryogenic unit that is provided to be in contact with at least the inlet pipe, and has the liquefied gas contained therein, wherein the cryogenic unit includes an insertion cylinder part that is provided to pass through the inlet pipe so that the inside of the inner box unit communicates with the inlet pipe and formed in a cylindrical shape in contact with the inlet pipe.

10. The liquefied gas storage tank of claim 9, wherein the insertion cylinder part includes:

an inner pipe part that is in contact with the inlet pipe; and an exterior part that is spaced apart from the inner pipe part at a predetermined interval to accommodate the liquefied gas and has a lower end portion coupled to the inner pipe part.

11. The liquefied gas storage tank of claim 9, wherein the insertion cylinder part has an opened upper end portion.

12. The liquefied gas storage tank of claim 9, wherein the cryogenic unit includes a double wall portion provided with a second flip door that communicates with a lower end portion of the insertion cylinder, extends to a lower wall portion of the inner box unit or the lower wall portion and a side wall portion of the inner box unit, and is opened and closed only in one direction so that the liquefied gas is introduced into the second flip door.

13. A ship, comprising:

the liquefied gas storage tank of claim 1; and a hull that is provided with a liquefied gas storage tank, and includes an engine unit providing driving force.

* * * * *